(12) United States Patent
Hogue

(10) Patent No.: US 7,341,506 B1
(45) Date of Patent: Mar. 11, 2008

(54) ADJUSTABLE COLLAPSIBLE ANIMAL HANGING GAMBREL

(76) Inventor: Wayne Hogue, 271 Sawgrass Dr., Shreveport, LA (US) 71106

( * ) Notice: Subject to any disclaimer, the term of this patent is extended or adjusted under 35 U.S.C. 154(b) by 0 days.

(21) Appl. No.: 11/306,975

(22) Filed: Jan. 18, 2006

(51) Int. Cl.
A22B 1/00 (2006.01)

(52) U.S. Cl. ...................................... 452/189

(58) Field of Classification Search ................ 452/185, 452/187–192, 197; 294/81.56, 74, 137, 142, 294/81.2; 224/921, 259, 260, 638, 103, 19.1, 224/19.3, 24, 67.1–67.3, 67.31, 67.32, 81.56, 224/81.1–81.3, 79, 80
See application file for complete search history.

(56) References Cited

U.S. PATENT DOCUMENTS

| | | | |
|---|---|---|---|
| 565,943 A | 8/1896 | Swartz | |
| 708,608 A | 9/1902 | Zander | |
| 892,719 A | 7/1908 | Gratton | |
| 902,655 A | 11/1908 | Heim | |
| 1,020,843 A | 3/1912 | Petersen | |
| 1,030,683 A | 6/1912 | Roskopf | |
| 1,033,223 A | 7/1912 | Wilson | |
| 1,085,439 A | 1/1914 | Knudson | |
| 1,107,110 A * | 8/1914 | Priem | 452/189 |
| 1,117,436 A | 11/1914 | Person | |
| 1,148,393 A | 7/1915 | McGrath | |
| 1,150,331 A | 8/1915 | Borkhuis | |
| 1,311,779 A | 7/1919 | Shank | |
| 1,485,161 A | 2/1924 | Blake | |
| 1,556,645 A * | 10/1925 | Stoney et al. | 134/42 |
| 1,603,913 A | 10/1926 | Gillitzer | |
| 2,093,732 A | 9/1937 | Pawlitschek | |
| 2,169,928 A | 8/1939 | Saley | |
| 2,331,566 A | 10/1943 | Pautz | |
| 2,411,856 A | 12/1946 | Harding | |
| 2,710,766 A * | 6/1955 | Erlewine | 452/192 |
| 2,809,069 A | 10/1957 | Neel | |
| 2,830,840 A | 4/1958 | Johnson | |
| 3,010,751 A * | 11/1961 | Day et al. | 294/81.2 |
| 4,027,357 A | 6/1977 | Morris | |
| 4,580,317 A | 4/1986 | Timothy | |
| 4,763,942 A | 8/1988 | Lyon | |
| 4,909,555 A * | 3/1990 | Blasi | 452/189 |
| 5,071,389 A | 12/1991 | Castle | |
| 5,145,224 A | 9/1992 | Welk | |
| 5,236,386 A | 8/1993 | Dingee | |

(Continued)

FOREIGN PATENT DOCUMENTS

| | | |
|---|---|---|
| DE | 132597 | 7/1902 |
| DE | 138139 | 1/1903 |

OTHER PUBLICATIONS

Cabela's Christmas 2005 Catalog p. 379.

*Primary Examiner*—Thomas Price

(57) ABSTRACT

An adjustable collapsible animal hanging gambrel comprising a multiple piece tubular telescopically adjustable spreader unit with rotating floating V-shaped impaling/supporting hooks on both ends of the spreader unit along with hanger cables connecting from the ends of the spreader unit to a common lifting shackle where a lifting device from above is to be attached for lifting the animal into the air. The pieces comprising the telescopic spreader unit contain a number of holes that form the adjustability and wide range of possible lengths whereby the length is secured by inserting a pin through aligned holes.

8 Claims, 3 Drawing Sheets

U.S. PATENT DOCUMENTS

| | | |
|---|---|---|
| 5,263,675 A | 11/1993 | Roberts |
| 5,288,265 A | 2/1994 | Beason |
| D345,780 S | 4/1994 | Ream |
| 5,304,091 A | 4/1994 | Wilkinson |
| D363,339 S | 10/1995 | Rohacek |
| 5,591,077 A * | 1/1997 | Rowe ........................ 452/189 |
| 5,938,521 A | 8/1999 | Jasek |
| 6,132,305 A | 10/2000 | Witherell |
| 6,186,882 B1 | 2/2001 | Adams |
| 6,264,544 B1 | 7/2001 | Mullins |
| D462,416 S | 9/2002 | Dallas |
| 6,712,687 B1 | 3/2004 | Douglas |
| 6,729,666 B2 * | 5/2004 | Mullis ..................... 294/81.56 |

* cited by examiner

ADJUSTABLE COLLAPSIBLE ANIMAL HANGING GAMBREL

CROSS-REFERENCE TO RELATED APPLICATIONS

Not applicable

FEDERALLY SPONSORED RESEARCH

Not applicable

SEQUENCE LISTING OR PROGRAM

Not applicable

FIELD OF INVENTION

This invention is in relation to gambrels—devices constructed for hanging, dressing, and processing game animals—and more particularly to a gambrel that is adjustable and collapsible, and facilitates hanging of whole or half carcasses.

PRIOR ART

Gambrels, or animal hanging devices, are typically used by hunters to raise harvested game off the ground for dressing and processing. The prior art is crowded with numerous and varied designs; however, all of the prior art gambrels have problematic design features that the present invention effectively eliminates.

The foremost problem with prior devices is their complex design and operation. U.S. Pat. Nos. 6,186,882; 5,263,675; 5,071,389; 2,411,856; and 1,020,843 are examples of prior devices that illustrate this element. Many of the previous devices are constructed with materials not readily available in the market or they contain specialty fabricated components with such complex construction as to severely limit the ability, and increase the costs, of anyone in constructing or using them. To do a simple job of suspending an animal for processing, the device need not be complex or expensive. The current invention is simple in design, construction, and use. It is constructed of materials readily available in the marketplace and comprises components that can be easily and economically fabricated by anyone skilled in the trade.

Another drawback with prior devices are the stationary fixed position impaling/supporting hooks. When attempting to insert the hooks through the hind legs of the game animal, if the hooks are in a fixed and stationary position, a large cut is required in order to impale the hook through the leg. U.S. Pat. Nos. 6,132,305; 4,909,555; and 5,591,077 are examples illustrating this drawback. The present invention has hooks that are easily manipulated for insertion and a very small cut is all that is necessary in order for the impaling/supporting hooks to be inserted through the leg of the animal.

Another problem and safety concern in prior devices is the distinct possibility of the gambrel dropping the carcass off the impaling/supporting hooks if the weight on one side becomes substantially different than on the other. Because a gambrel is lifted from a single point, it also acts much like a balance bar. As weight on one side increases, that side will drop lower and at some point of imbalance, the heavy leg will slip off the hook. Another scenario is when during the skinning process, if one side is pulled on harder than the other side there is also the potential for dislodging the hook from the leg. Such a device does not allow using only one side if, for instance, only half a carcass needs to be processed. U.S. Pat. Nos. D462,416; 6,186,882; 5,263,675; 5,304,091; and 5,288,265 show hook designs with this flaw. Additionally, this flaw is prevalent in most of the retail commercially available gambrels which are similar to the one on page 379 of the Cabela's Christmas 2005 catalog. The present invention will securely hold the carcass no matter what the weight differential is between the hooks. The present invention also not only facilitates using only one impaling/supporting hook if necessary, it is also designed of such strength as to allow hanging an entire animal on one hook if necessary.

The fixed width, or limited width adjustability, design of the prior designs limits their use and functionality. Because of the fixed or limited width, the rear legs of the animal may not be spread adequately to ease evisceration and splitting of the carcass. Also, the fixed width design is usually of such a length that it forces the device to be used at the tendon behind the knee where the dressing process begins; thereby creating an obstruction to the process itself by the hooks being placed where the process actually starts. Some of the prior patents that illustrate this problem are U.S. Pat. Nos. 5,145,224; 4,027,357; 4,580,317; and 5,071,389. The present invention's telescoping extendibility range of adjustable length allows the legs to be spread wide enough to ease the process, and it allows the device to be used at the lower tendon just above the ankle, the Achilles' tendon, thereby placing the gambrel completely out of the way of the dressing process.

U.S. Pat. Nos. 6,132,305; 5,236,386; 2,411,856; and 5,288,265, as well as the gambrel on page 379 of the Cabela's Christmas 2005 catalog, are examples of an impaling/supporting hook design flaw that would allow the spreader unit of the gambrel to be pushed through the cut made in the leg of the animal for which the hooks are to be inserted. The proximal side depth of the hook is shallow, thereby allowing the possibility that the spreader arm could pass through the cut made for the hook. The depth and rotatability of the impaling/supporting hooks of the present invention eliminate this condition.

Many of the prior designs are of questionable strength and lifting capacity. The devices were designed to be lightweight and compact but at the cost of strength and capacity. Designers promote portability into the field, but very few game animals are processed in the field; most are brought to a central location or camp for processing where the processing facilities are of a more permanent or season-long nature. Patents illustrating this deficiency are U.S. Pat. Nos. 5,938,521; 4,580,317; and 2,169,928. The present invention is intended to be used in the traditional game processing method by hand or with a mechanical skinning assistance device that helps to pull the hides from the animal; therefore, it is constructed to withstand weights far exceeding the weight of the animal itself, but still be relatively compact and light-weight when collapsed.

U.S. Pat. No. 4,909,555 shows an adjustable gambrel similar to the present invention, but with the spreader bar made with round tubing or pipe, a smaller size slideably inserted into a larger size, with multiple hole and cotter pin couplings as well as a special impaling hook structure with lugs that secure them into the ends of the spreader bar and no specific hanger specifications. The present invention specifies material other than round tubing or pipe for the spreader bar to eliminate the probability of the units twisting increasing the difficulty of lining up two holes up between the inner and outer tubes for inserting the cotter pin when the tubes rotate. The present invention's spreader unit length can also be telescopically adjusted either before or after inserting the hooks into the legs of the animal whereas the previous patented gambrel's length would have to be set before inserting the hooks into the legs of the animal. The present invention also utilizes much larger pins in the adjustable spreader unit to eliminate the potential sheering of the much smaller cotter pins shown in the previous design. As compared to the previous design, the present invention's pinned, floating, rotatable hooks cannot be dislodged from the spreader bar as could happen to the previous design's lugged hooks. The present invention's hooks are much easier to insert into the game, and allow use of only one side of the gambrel where the previous design does not due to the fixed position hooks. An additional difference is the previous patent shows a variety of different materials connecting the hooks to the lifting ring or hook including rope which would not be strong enough to safely lift large animals, whereas the present invention specifies much stronger material be used.

U.S. Pat. No. 5,263,675 also shows an extendable spreader bar composed of inner members slibably inserted into larger outer members connected with spring-ball pins with pull rings. The present invention differs significantly in that the previous design is part of a component support system, not an animal lifting gambrel.

Other patents of interest not specifically mentioned herein are cited in such prior art set forth in the Information Disclosure Statement filed in this application and disclose other forms of gambrel devices. All of said prior art patents contain one or more of the aforementioned problematic traits addressed and alleviated by the present invention.

OBJECTS AND ADVANTAGES

Accordingly, several objects and advantages of the present gambrel invention are:

(a) a gambrel that is simple in design, construction, and use but eliminates all flaws in previous gambrel designs;

(b) a gambrel constructed of readily available material and components easily and economically fabricated by anyone skilled in the trade;

(c) a gambrel with impaling/supporting hooks that are easily rotated and manipulated into small cuts in the animal's legs;

(d) a gambrel that will securely hold a carcass even if weights are significantly different on either hook;

(e) a gambrel with impaling/supporting hooks that rotate easily to allow using only one side of the gambrel;

(f) a gambrel with an adjustable spreader unit with an expansive range of length adjustability that will work equally well at either the knee tendon or the Achilles tendon at the ankle tendon of an animal's leg;

(g) a gambrel with sufficient width adjustability to adequately spread the legs to make processing easier (h) a gambrel with a spreader unit that can be telescopically adjusted after inserting the hooks into the leg of the animal;

(i) a gambrel with hooks designed to securely hold the animal's legs in a spread position without worry of dislodging them.

(j) a gambrel tested to over 1000 pounds total and over 500 pounds on a single hook.

Other objects and advantages will become apparent from a consideration of the ensuing description and drawings.

SUMMARY

The present invention comprises an adjustable collapsible animal hanging gambrel device for hanging harvested game animals for processing comprising a rigid multiple section tubular spreader unit telescopically inserted one into the other with the length fixed and secured by a pin inserted through aligned holes in the tubular sections. Rotating impaling/supporting hooks are securely pinned on the distal ends of the spreader unit along with hanger unit cables whose other end is secured to a single lifting unit shackle. The gambrel can be used at the tendon just above the ankle, the Achilles tendon, thereby placing it completely out of the way of the skinning process. This invention had been proven in use and its lifting capacity has been tested to over 1000 pounds.

DRAWINGS

Figures

The drawings furnished here illustrate a preferred construction of the present invention in which the aforementioned advantages and features are clearly disclosed as well as others which will be readily understood from the description of the illustrated embodiment.

DRAWINGS

Reference Numerals

Figure 1:
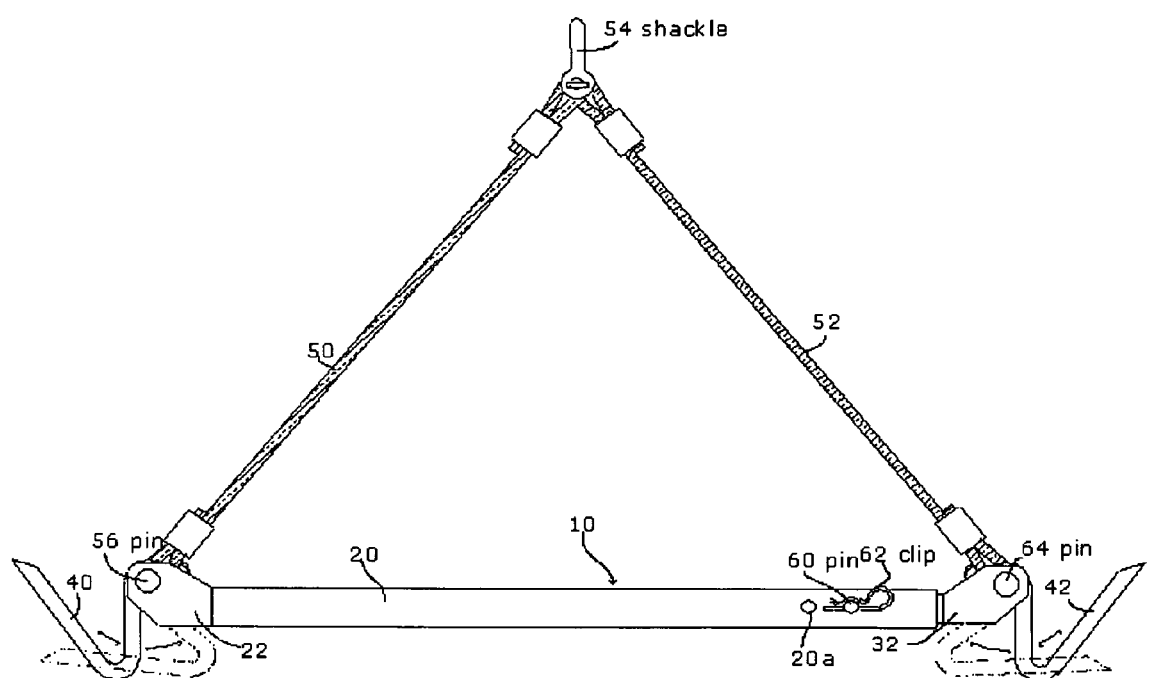
FIG. 1 is a front plan view of the present gambrel invention in the telescopically collapsed position.

Following is a detailed listing of the elements and parts of the present gambrel with identifying numbers.

10—Gambrel
20—Outer Section of Spreader Unit
20a—Bore For Length Adjustment Pin
20b—Bore For Length Adjustment Pin
22—Outer Section Hook & Hanger Plate
22a—Bore For Hook & Hanger Pin
24—Outer Section Hook & Hanger Plate
24a—Bore For Hook & Hanger Pin
30—Inner Section of Spreader Unit
30a—Bore For Length Adjustment Pin
30b—Bore For Length Adjustment Pin
30c—Bore For Length Adjustment Pin
30d—Bore For Length Adjustment Pin
30e—Bore For Length Adjustment Pin
30f—Bore For Length Adjustment Pin
30g—Bore For Length Adjustment Pin
32—Inner Section Hook & Hanger Plate 32a—Bore For Hook & Hanger Pin
34—Inner Section Hook & Hanger Plate
34a—Bore For Hook & Hanger Pin
40—Outer Section End Impaling/Supporting Hook
42—Inner Section End Impaling/Supporting Hook
50—Outer End Hanger Cable
52—Inner End Hanger Cable
54—Hanger Cable Connecting Shackle
56—Outer End Hook & Hanger Pin
58—Outer End Hook & Hanger Pin Retaining Clip
60—Length Adjustment Pin
62—Length Adjustment Pin Retaining Clip
64—Inner End Hook & Hanger Pin
66—Inner End Hook & Hanger Pin Retaining Clip

DETAILED DESCRIPTION

Preferred Embodiment

The drawings furnished with this application illustrate a preferred construction and embodiment of the gambrel of the present invention in which the above objects, advantages, and features are clearly disclosed as well as others which will be readily envisioned and understood from the following descriptions of the illustrations.

In the drawings:

FIG. 1 is a front view of the preferred embodiment of the gambrel unit 10 of the present invention in the telescopically closed or collapsed position. The gambrel 10 is seen to comprise a spreader unit consisting of an inner section 30 and an outer section 20 with said inner section 30 inserted into the larger outer section 20, held telescopically in place by pin 60, inserted through bore 20b (or 20a), secured with clip 62, constituting the telescopic length adjusting capabilities of the spreader unit. Welded on the distal end of 20, on opposite sides, are outer section end hook and hanger plates 22 and 24. Pin 56 is inserted through bore 22a, one end of outer end cable hanger unit 50, outer section end impaling/supporting hook 40, and bore 24a, then secured with clip 58. The opposite end of cable 50 is held at the common lifting point by shackle 54. Welded on the distal end of 30, on opposite sides, are inner section end hook and hanger plates 32 and 34. Pin 64 is inserted through bore 32a, inner section end impaling/supporting hook 42, one end of inner end hanger unit cable 52, and bore 34a, then secured with clip 66. The other end of hanger unit 52 is held by shackle 54 where a lifting device is attached to lift the gambrel and animal into the air.

Figure 2:
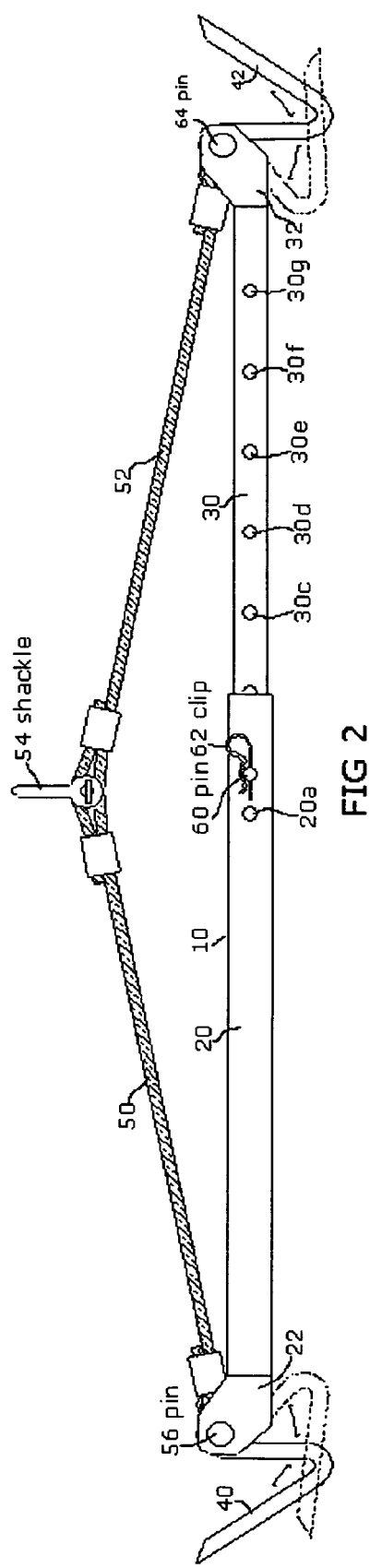
FIG. 2 is a front view of the gambrel in the telescopically fully extended position.

FIG. 2 is a front view of gambrel 10 in the telescopically open or extended position showing the extensive length adjustment capabilities of the present gambrel. Bore 30a is aligned with bore 20b (or 20a) and pin 60 is inserted and secured by clip 62 to hold the spreader unit in the extended position. Spreader unit section 30 is seen to have a plurality of bores, 30a, 30b, 30c, 30d, 30e, 30f, 30g, each of which constitute a length adjustment choice for the user.

Figure 3:
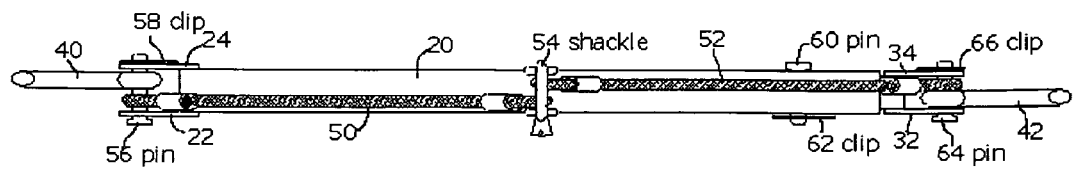
FIG. 3 is a top view of the gambrel in the collapsed position.
Figure 4:
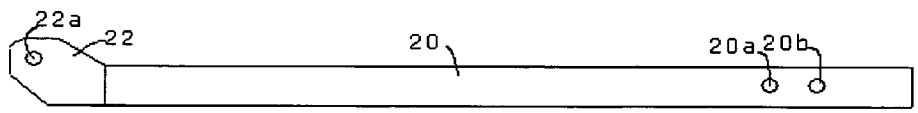
FIG. 4 is a detail side view of the outer section of the spreader unit.
Figure 5:
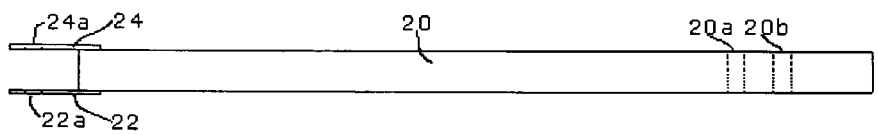
FIG. 5 is a detail top view of the outer section of the spreader unit.
Figure 6:
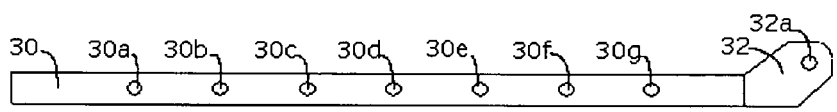
FIG. 6 is a detail side view of the inner section of the spreader unit.
Figure 7:
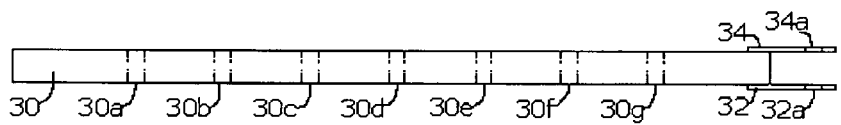
FIG. 7 is a detail side top view of the inner section of the spreader unit.
Figure 8:
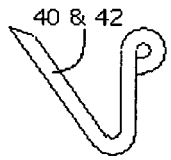
FIG. 8 is a detail view of the impaling/supporting hook.
Figure 9:
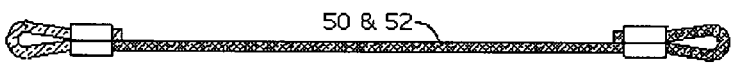
FIG. 9 is a detail view of the hanger cable.

FIG. 3 is a top view looking down of the present gambrel showing more detail to the configuration and layout of the previously detailed components.

FIG. 4, FIG. 5, FIG. 6, FIG. 7, and FIG. 8 are all detailed views of the main individual components of the present gambrel previously described and detailed.

OPERATION

Preferred Embodiment

In use, hooks 40 and 42 are inserted, or impaled, through cuts made in the animal's legs, completely through the hide on both sides between the leg bone and the tendon at the back of the knee or lower on the leg just above the hoof, or the Achilles tendon. A lifting device located in an overhead position, such as a block and tackle or a winch, is connected to shackle 54 and used to lift the gambrel and thus the animal into the air.

Spreader unit length adjustment is accomplished by removing pin 60 and telescopically sliding section 30 either in or out of section 20 until the desired length is achieved, aligning bores in 20 and 30, reinserting pin 60 and securing it with clip 62.

DESCRIPTION

Alternative Embodiment

Several alternatives, construction, or different materials to the preferred embodiment can be envisioned. The spreader unit could be constructed of more than 2 pieces and could be made from different kinds or sizes of tubing. Hooks 40 and 42 could be replaced with cables and used as nooses around the legs of the animal instead of impaling hooks. There are also several alternatives to the shown pins and clips. For instance, wire lock pins or spring loaded ball pins could be used instead or the pins could simply be bolted, braded, or tack-welded. There are several alternatives to cables 50 and 52, round steel or flat bar for instance, and shackle 54 could be a steel ring or oval.

Various modes of carrying out the invention are contemplated as being within the scope of the claims. It will be readily apparent to those skilled in the art that modifications and changes in the apparatus may be made without departing from the scope and spirit of the invention.

CONCLUSION, RAMIFICATIONS, AND SCOPE

Accordingly the reader will see that, according to the invention, I have provided a gambrel that effectively eliminates all the problematic disadvantages of all previous designs.

While the above description contains many specificities, these should not be construed as limitations on the scope of the invention, but as exemplifications of the presently preferred embodiments thereof. Many other ramifications and variations are possible within the teachings of the invention.

Thus the scope of the invention should be determined by the appended claims and their legal equivalents, and not by the example given.

What is claimed is:

1. An adjustable collapsible animal hanging gambrel comprising:
    (a) a rigid spreader unit composed of multiple substantially square or rectangular profile tubular sections telescopically inserted one into the other;
    (b) impaling supporting hooks rotatably secured on the distal ends of said spreader unit; and
    (c) hanger units rotatably secured from each distal end of the said spreader unit to a common lifting unit.

2. The gambrel of claim 1 wherein said spreader unit tubular members each contain a plurality of bores wherein a pin of substantial diameter is inserted through opposing aligned bores to fix and secure the length of said spreader unit whereby user has multiple choices of length of said spreader unit.

3. The gambrel of claim 1 wherein said rotatably secured impaling supporting hooks are of a shape similar to a V whereby said hooks impart maximum lift supporting strength.

4. The gambrel of claim 1 wherein said impaling supporting hooks and said hanger units are located in a void between outer walls of said distal ends of said spreader units and rotatably secured by pins passed through opposing bores in said outer walls whereby weight placed upon impaling supporting hooks is supported by said pins resting on multiple seats.

5. The gambrel of claim 1 wherein said gambrel with rotatably secured impaling supporting hooks and rotatably secured hanger units are constructed and arraigned such that whereby a carcass being processed will remain secure if weight on opposing sides becomes substantially inconsistent or if only one side is used as in processing only one half of a carcass.

6. The gambrel of claim 1 wherein said gambrel unit is of sufficient strength and construct to withstand lifting weights of up to 2000 pounds.

7. A method of hanging a game animal from the hind ankles for processing comprising:
   (a) providing a gambrel with a telescoping rigid spreader unit composed of multiple tubular sections with substantially V-shaped hooks rotatably secured to both ends of said spreader unit along with hanger cables with opposite ends attached to a common lifting unit or shackle;
   (b) providing a harvested game animal such as a deer;
   (c) making cuts or slices on both hind legs through the hide and between the Achilles tendon and the leg bone;
   (d) impaling said rotatably secured hooks on said gambrel through said cuts or slices on each hind leg whereby hind legs are spread apart and stabilized by said gambrel removed from the area where the skinning process begins in the proximity of the knee;
   (e) attaching a winch or other lifting device mounted in an overhead position to said common lifting unit or shackle;
   (f) lifting said animal into the air with said lifting device.

8. An adjustable collapsible animal hanging gambrel comprising:
   (a) a rigid spreader unit composed of multiple tubular sections preferably of substantially square or rectangular profile slidably inserted one into the other;
   (b) a plurality of bores through facing profiles of each of said tubular sections;
   (c) pins of substantial diameter inserted through aligned said bores in said tubular sections fixing and stabilizing the length of said spreader unit;
   (d) substantially V-shaped rotating impaling supporting hooks securely pinned to the distal ends of said spreader unit;
   (e) wire rope or other substantial material hanger units pinned one end to the distal ends of said spreader unit and opposite ends to a common lifting unit or shackle whereby an overhead winch or other lifting device is attached.

* * * * *